United States Patent
Chen

(10) Patent No.: US 11,935,166 B2
(45) Date of Patent: Mar. 19, 2024

(54) TRAINING METHOD AND APPARATUS FOR IMAGE PROCESSING MODEL, IMAGE PROCESSING METHOD AND APPARATUS FOR IMAGE PROCESSING MODEL, AND STORAGE MEDIUM

(71) Applicant: TENCENT TECHNOLOGY (SHENZHEN) COMPANY LIMITED, Guangdong (CN)

(72) Inventor: Fasheng Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 426 days.

(21) Appl. No.: 17/318,780

(22) Filed: May 12, 2021

(65) Prior Publication Data

US 2021/0264655 A1    Aug. 26, 2021

Related U.S. Application Data

(63) Continuation of application No. PCT/CN2020/081208, filed on Mar. 25, 2020.

(30) Foreign Application Priority Data

Mar. 25, 2019    (CN) .......................... 201910228962.5

(51) Int. Cl.
*G06K 9/00* (2022.01)
*G06T 3/00* (2006.01)
(Continued)

(52) U.S. Cl.
CPC ............ *G06T 11/60* (2013.01); *G06T 3/0075* (2013.01); *G06T 7/337* (2017.01); *G06T 9/002* (2013.01); *G06T 2207/20081* (2013.01)

(58) Field of Classification Search
CPC ....... G06T 11/60; G06T 3/0075; G06T 7/337; G06T 9/002; G06T 2207/20081
See application file for complete search history.

(56) References Cited

U.S. PATENT DOCUMENTS

| 11,683,362 B2 * | 6/2023 | Chung .................... H04L 67/04 |
| | | 382/274 |
| 2015/0324633 A1 | 11/2015 | Whitehill et al. |

(Continued)

FOREIGN PATENT DOCUMENTS

| CN | 108537720 A | * | 9/2018 |
| CN | 108564127 A | * | 9/2018 | ......... G06K 9/00221 |

(Continued)

OTHER PUBLICATIONS

Deepfake Video Detection Using Recurrent Neural Networks, David Guera et al., IEEE, 2018, pp. 1-10 (Year: 2018).*

(Continued)

*Primary Examiner* — Jayesh A Patel
(74) *Attorney, Agent, or Firm* — ARENTFOX SCHIFF LLP

(57) ABSTRACT

Embodiments of this disclosure include a training method for an image processing model. In the method, parameters of an encoder in the image processing model are updated according to a to-be-replaced face in an original image, to configure the encoder to encode the to-be-replaced face to obtain a visual feature of the to-be-replaced face. Parameters of a decoder in the image processing model are updated according to the to-be-replaced face in the original image, to configure the decoder to perform decoding based on the visual feature of the to-be-replaced face. The parameters of the decoder are further updated according to a target face in a target image without changing the parameters of the encoder, to configure the decoder to perform decoding based (Continued)

on the visual feature of the to-be-replaced face and obtain a target face having the same visual feature as the to-be-replaced face.

20 Claims, 11 Drawing Sheets

(51) Int. Cl.
*G06T 7/33* (2017.01)
*G06T 9/00* (2006.01)
*G06T 11/60* (2006.01)

(56) References Cited

U.S. PATENT DOCUMENTS

| | | | | |
|---|---|---|---|---|
| 2017/0148430 | A1* | 5/2017 | Lee | G10L 15/063 |
| 2018/0181797 | A1* | 6/2018 | Han | G06V 10/764 |
| 2019/0005305 | A1* | 1/2019 | Huang | G06T 7/11 |
| 2019/0197670 | A1* | 6/2019 | Ferrer | G06V 10/82 |
| 2019/0295302 | A1* | 9/2019 | Fu | G06V 10/82 |
| 2019/0332850 | A1* | 10/2019 | Sharma | G06T 5/20 |
| 2020/0294294 | A1* | 9/2020 | Petriv | G06N 3/08 |
| 2021/0089759 | A1* | 3/2021 | Todorov | G06V 40/174 |
| 2023/0260176 | A1* | 8/2023 | Kim | G06V 40/171 |
| | | | | 345/619 |
| 2023/0260260 | A1* | 8/2023 | Li | G06V 10/82 |

FOREIGN PATENT DOCUMENTS

| | | |
|---|---|---|
| CN | 108647560 | 10/2018 |
| CN | 108710831 | 10/2018 |
| CN | 109447259 | 3/2019 |
| CN | 110148081 | 8/2019 |
| CN | 110415166 | 11/2019 |
| CN | 110826593 | 2/2020 |

OTHER PUBLICATIONS

DeepFakes: a New Threat to Face Recognition? Assessment and Detection, Pavel Korshunov et al., arXiv, 2018, pp. 1-5 (Year: 2018).*
MesoNet: a Compact Facial Video Forgery Detection Network, Darius Afchar et al., arXiv, 2018, pp. 1-7 (Year: 2018).*
ReenactGAN: Learning to Reenact Faces via Boundary Transfer, Wayne Wu et al., 2018, pp. 1-17 (Year: 2018).*
AI face-changing technology—Overview of DeepFakes (1), 2018, pp. 1-8 (Year: 2018).*
International Search Report and Written Opinion dated Jun. 15, 2020 in International Application No. PCT/CN2020/081208, (7 pages).
Written Opinion dated Jun. 15, 2020 in International Application No. PCT/CN2020/081208. (4 pages).
"AI Face Changing Technology—Overview of DeepFakes (1)," Tencent Cloud, URL: https://cloud.tencent.com/developer/article/1107307, Apr. 24, 2018. (4 pages).

* cited by examiner

TRAINING METHOD AND APPARATUS FOR IMAGE PROCESSING MODEL, IMAGE PROCESSING METHOD AND APPARATUS FOR IMAGE PROCESSING MODEL, AND STORAGE MEDIUM

RELATED APPLICATION

This application is a continuation of International Application No. PCT/CN2020/081208, entitled "IMAGE PROCESSING MODEL TRAINING METHOD, IMAGE PROCESSING METHOD AND DEVICE, AND STORAGE MEDIUM" and filed on Mar. 25, 2020, which claims priority to Chinese Patent Application No. 201910228962.5, entitled "TRAINING METHOD AND APPARATUS FOR IMAGE PROCESSING MODEL, IMAGE PROCESSING METHOD AND APPARATUS FOR IMAGE PROCESSING MODEL, AND STORAGE MEDIUM" and filed on Mar. 25, 2019. The entire disclosures of the prior applications are hereby incorporated herein by reference in their entirety.

FIELD OF THE TECHNOLOGY

This application relates to image processing technologies, including training and processing of an image processing model.

BACKGROUND OF THE DISCLOSURE

In applications such as movie special effect and social networking, there is a need to replace, while maintaining a style of a face of a person (also referred to as a to-be-replaced face) in an original image (e.g., a picture or a video frame), the to-be-replaced face with a face of another person (also referred to as a target face). Therefore, an artificial intelligence technology provides a solution to train a proper image processing model to support the above application

SUMMARY

Embodiments of this disclosure include a training method and apparatus for an image processing model, an image processing method and apparatus for an image processing model, and a non-transitory computer-readable storage medium, to improve efficiency of training an image processing model while ensuring a recognition precision of an image processing model.

The technical solutions in the embodiments of this disclosure can be implemented as follows:

According to an aspect, the embodiments of this disclosure provide a training method for an image processing model. The method can be performed by a training apparatus for example. In the method, parameters of an encoder in the image processing model are updated according to a to-be-replaced face in an original image, to configure the encoder to encode the to-be-replaced face to obtain a visual feature of the to-be-replaced face. Parameters of a decoder in the image processing model are updated according to the to-be-replaced face in the original image, to configure the decoder to perform decoding based on the visual feature of the to-be-replaced face. Further, the parameters of the decoder are updated according to a target face in a target image without changing the parameters of the encoder, to configure the decoder to perform decoding based on the visual feature of the to-be-replaced face and obtain a target face having the same visual feature as the to-be-replaced face.

According to another aspect, the embodiments of this disclosure include an image processing method for an image processing model. In the method, an original image is encoded by an encoder of the image processing model to obtain a visual feature of a to-be-replaced face in the original image. A decoder of the image processing model performs decoding based on the visual feature of the to-be-replaced face to obtain a target face having the same visual feature as the to-be-replaced face. Further, parameters of the decoder are obtained by performing an update according to a target image comprising the target face without changing parameters of the encoder.

According to another aspect, the embodiments of this disclosure include a training apparatus for an image processing model. The training apparatus includes circuitry configured to update parameters of an encoder in the image processing model according to a to-be-replaced face in an original image, to configure the encoder to encode the to-be-replaced face to obtain a visual feature of the to-be-replaced face. The circuitry is configured to update parameters of a decoder in the image processing model according to the to-be-replaced face in the original image, to configure the decoder to perform decoding based on the visual feature of the to-be-replaced face. Further, the circuitry is configured to update the parameters of the decoder according to a target face in a target image without changing the parameters of the encoder, to configure the decoder to perform decoding based on the visual feature of the to-be-replaced face and obtain a target face having the same visual feature as the to-be-replaced face.

According to another aspect, the embodiments of this disclosure include an image processing apparatus. The image processing apparatus includes circuitry configured to encode an original image to obtain a visual feature of a to-be-replaced face in the original image. The circuitry is configured to perform decoding based on the visual feature of the to-be-replaced face to obtain a target face having the same visual feature as the to-be-replaced face. Further, parameters of the decoder are obtained by performing an update according to a target image comprising the target face without changing parameters of the encoder.

According to another aspect, the embodiments of this disclosure include a training apparatus for an image processing model, including a memory and a processor. The memory is configured to store executable instructions. The processor is configured to implement, when executing the executable instructions stored in the memory, the training method for an image processing model.

According to another aspect, the embodiments of this disclosure include an image processing apparatus, including a memory and a processor. The memory is configured to store executable instructions. The processor is configured to implement, when executing the executable instructions stored in the memory, the image processing method for an image processing model.

According to another aspect, the embodiments of this disclosure provide a non-transitory computer-readable storage medium storing instructions which when executed by a processor cause the processor to perform the training method for an image processing model or the image processing method.

According to one aspect of the embodiments of this disclosure, a computer program product including instructions is provided, the instructions, when run on a computer, causing the computer to perform the training method for an image processing model or the image processing method.

The embodiments of this disclosure can have the following beneficial effects:

An encoder and a decoder of an image processing model are trained by using an original image, and a corresponding decoder is trained by using a target object while parameters of the encoder are maintained unchanged, thereby implementing training of the decoder and decoupling from the original image, reducing a quantity of images required for training, and effectively shortening a training time of the image processing model.

DESCRIPTION OF EMBODIMENTS

To make the objectives, technical solutions, and advantages of this disclosure clearer, the following describes this disclosure in further detail with reference to the accompanying drawings. The described embodiments are provided as examples and are not to be considered as a limitation on the scope of this disclosure. All other embodiments obtained by a person of ordinary skill in the art shall fall within the protection scope of this disclosure.

In the following description, the term "some embodiments" describes subsets of all possible embodiments, but it may be understood that "some embodiments" may be the same subset or different subsets of all the possible embodiments, and can be combined with each other without conflict.

Before the embodiments of this disclosure are further described in detail, a description is made on nouns and terms in the embodiments of this disclosure, and the nouns and terms in the embodiments of this disclosure are applicable to the following explanations.

(1) An original image can also be referred to as an original face image, that is, an image including a to-be-replaced face, for example, a picture or a frame image of a video.

(2) A target image can also be referred to as a target face image, that is, an image including a face used for replacing the "to-be-replaced face", for example, a picture or a frame image in a video.

(3) An encoder can be configured with a model for performing feature dimension reduction (e.g., reducing dimensions of a feature, also referred to as encoding or feature extraction) on the to-be-replaced face in the original image, and outputting a feature for representing a style of the to-be-replaced face.

(4) A style feature (or visual feature), such as an easily recognizable feature that is shown by the to-be-replaced face visually and that is extracted from the to-be-replaced face in the original image based on an intermediate layer (a hidden layer) of the encoder, may include an expression, a mien, illumination, a mouth shape, a line-of-sight direction, whether eyes are closed or not, a skin color, and the like.

(5) A decoder can be configured with a model that is in a one-to-one correspondence with a target face, and is configured to restore (also referred to as decode or reconstruct) a style feature inputted into the decoder to an image of a target face having a corresponding style feature.

(6) Face swapping can refer to replacing the to-be-replaced face in the original image with a target face having the same style feature as the to-be-replaced face.

First, an image processing model that can be provided by embodiments of this disclosure is described.

Figure 1:
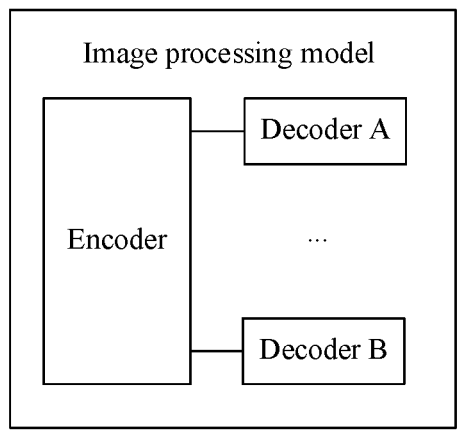
FIG. 1 is a schematic structural diagram of an image processing model according to an embodiment of this disclosure.

FIG. 1 is a schematic structural diagram of an image processing model according to an embodiment of this disclosure. The image processing model includes an encoder and a decoder. The decoder can be configured with a one-to-one correspondence with a target face for replacing a "to-be-replaced face". Therefore, a quantity of decoders in the image processing model can depend on a quantity of different target faces (e.g., different human faces) that need to be processed by the image processing model. For example, when the image processing model needs to replace a to-be-replaced face in a video with two different target human faces, decoders corresponding to the two different target human faces need to be set in the image processing model.

Figure 2:
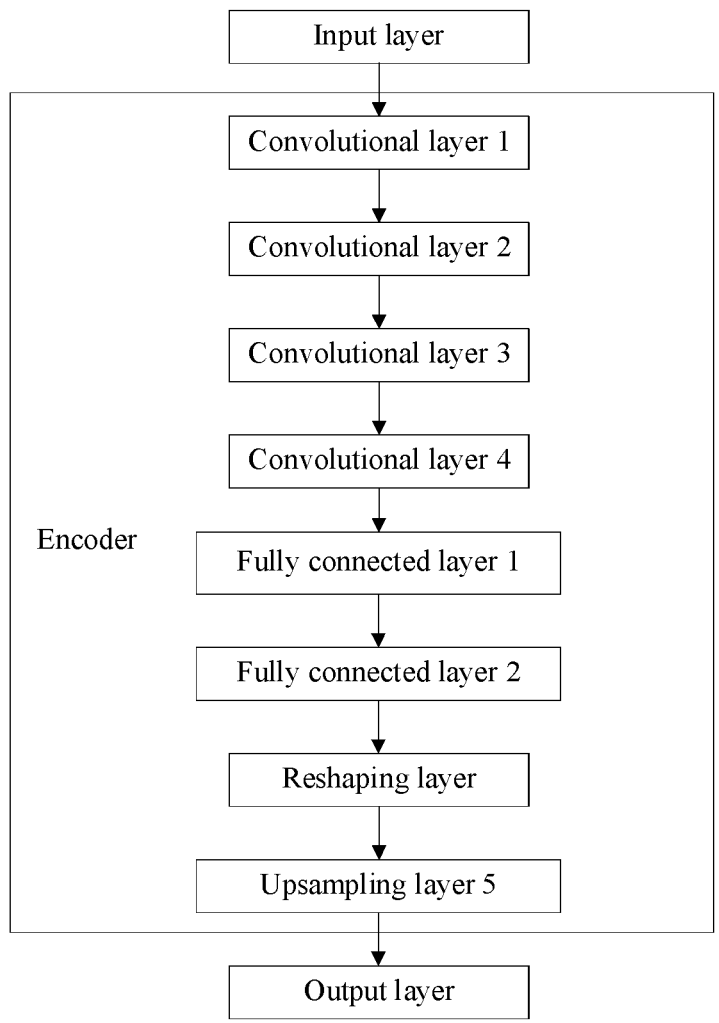
FIG. 2 is an exemplary structural diagram of an encoder according to an embodiment of this disclosure.

FIG. 2 is an exemplary structural diagram of an encoder according to an embodiment of this disclosure. As shown in FIG. 2, the encoder can include four convolutional layers, two fully connected layers, one reshaping layer, and one upsampling layer. Exemplary parameters of the layers are shown in Table 1. However, layer types and a quantity of channels in the encoder can vary, and are not limited to those shown in FIG. 1 and Table 1.

TABLE 1

| Layer type | Quantity of channels | Convolution kernel | Step | Filler | Activation function |
|---|---|---|---|---|---|
| Input layer | 3 | — | — | — | — |
| Convolutional layer 1 | 128 | (5, 5) | (2, 2) | Same pixel | Parametric rectified linear unit (pReLU) |
| Convolutional layer 2 | 256 | (5, 5) | (2, 2) | Same pixel | pReLU |
| Convolutional layer 3 | 512 | (5, 5) | (2, 2) | Same pixel | pReLU |
| Convolutional layer 4 | 1024 | (5, 5) | (2, 2) | Same pixel | pReLU |
| Fully connected layer 1 | 1024 | (5, 5) | — | — | pReLU |
| Fully connected layer 2 | 16384 | (5, 5) | — | — | pReLU |
| Reshaping layer | — | (4, 4, 1024) | — | — | — |
| Upsampling layer 1 | 512 | (3, 3) | (2, 2) | Same pixel | pReLU |

Figure 3:
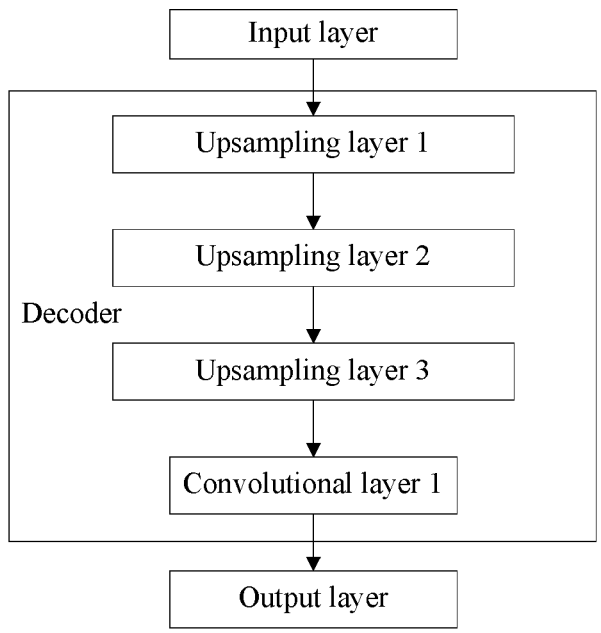
FIG. 3 is an exemplary structural diagram of a decoder according to an embodiment of this disclosure.

FIG. 3 is an exemplary structural diagram of a decoder according to an embodiment of this disclosure. As shown in FIG. 3, the decoder can include three upsampling layers and one convolutional layer. Exemplary parameters of the layers of the decoder are shown in Table 2. However, layer types and a quantity of channels in the decoder can vary, and are not limited to those shown in FIG. 3 and Table 2.

TABLE 2

| Layer type | Quantity of channels | Convolution kernel | Step | Filler | Activation function |
|---|---|---|---|---|---|
| Input layer | 512 | — | — | — | — |
| Upsampling layer 1 | 256 | — | (2, 2) | Same pixel | pReLU |
| Upsampling layer 2 | 128 | (3, 3) | (2, 2) | Same pixel | pReLU |
| Upsampling layer 3 | 64 | (3, 3) | (2, 2) | Same pixel | pReLU |
| Convolutional layer 4 | 3 | (3, 3) | (2, 2) | Same pixel | — |

Figure 4:
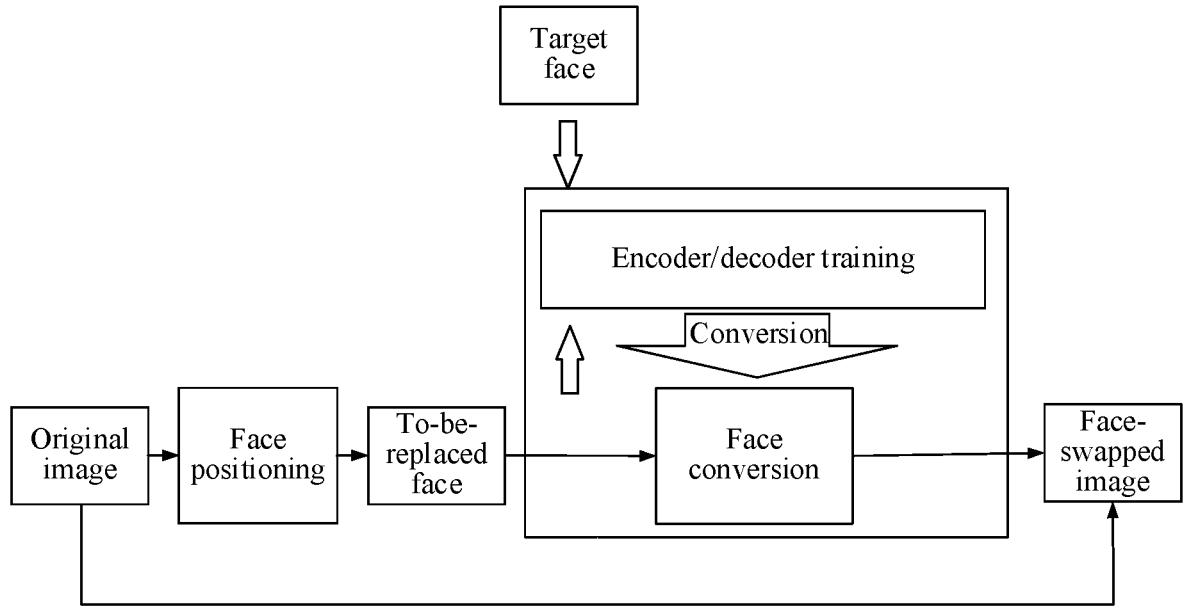
FIG. 4 is a schematic principle diagram of performing face swapping by using an image processing model according to an embodiment of this disclosure.

FIG. 4 is a schematic principle diagram of performing face swapping by using an image processing model according to an embodiment of this disclosure. After an encoder and a decoder are trained, the encoder extracts a style feature from a to-be-replaced face in an original image (e.g., encodes the to-be-replaced face), and the style feature is inputted into the decoder for decoding. The decoding process is a process of face conversion, and a formed new face-swapped image includes facial features of a target face and a style of the to-be-replaced face, for example, an expression and a mien.

Figure 5:
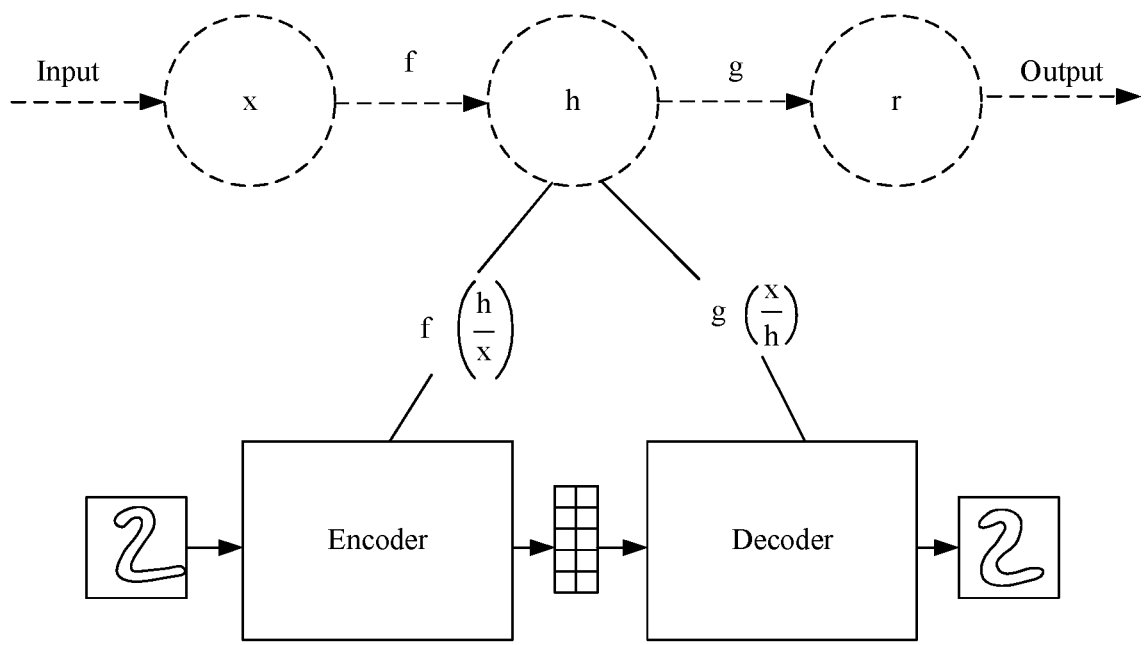
FIG. 5 is a schematic principle diagram of performing face swapping by using an image processing model according to an embodiment of this disclosure.

FIG. 5 is a schematic principle diagram of performing face swapping by using an image processing model according to an embodiment of this disclosure. x denotes an inputted to-be-replaced face, an encoding function of an encoder for x may be denoted by: f(h/x), and a corresponding encoding result is f(h/x)*x. Therefore, x is encoded to be an implicit feature h representing a style, and the number of dimensions of the feature h is less than that of x. Therefore, it may also be considered that the to-be-replaced face is expressed in a compressed manner. A decoding function of a decoder may be denoted by g(x/h), decoding is performed according to an inputted feature h, and a reconstructed to-be-replaced face r obtained through decoding may be denoted by g(x/h)*h.

When the image processing model includes two or more decoders (e.g., FIG. 1 shows a decoder A and a decoder B), the decoders share the same encoder.

For example, assuming that a target face of the decoder A is a face of an object A and a target face of the decoder B is a face of an object B, for a style feature obtained by encoding a to-be-replaced face in the same original image (a face of an object C) by the encoder, the decoder A may perform decoding based on the style feature, to obtain, through reconstruction, a target face A having the same style feature, and the decoder B may perform decoding based on the style feature, to obtain, through reconstruction, a target face B having the same style feature.

The object may be any creature or being (including a human being and an animal) having five sense organs. Correspondingly, a face of the object may be a human face, an animal face, or the like. In the following, a human face is used as an example to continuously describe a processing process of the image processing model according to this embodiment of this disclosure.

Figure 6:
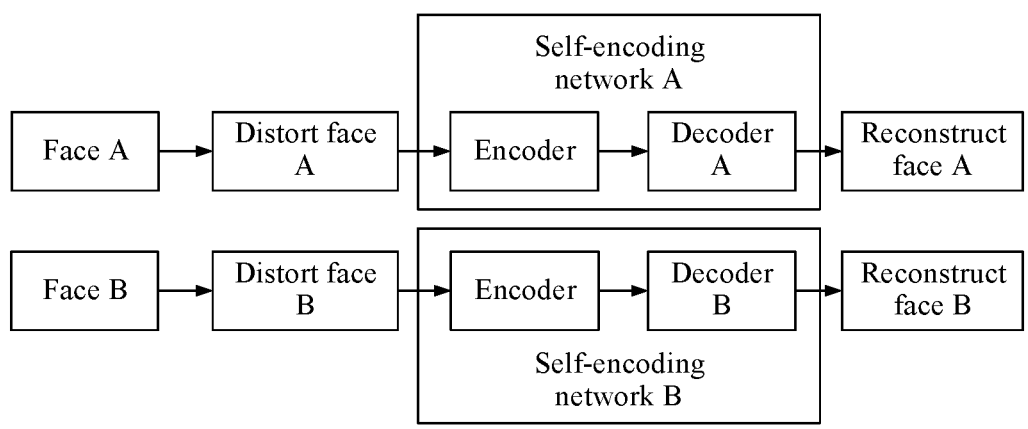
FIG. 6 is a schematic principle diagram of a training method for an image processing model by using a related technology according to an embodiment of this disclosure.

FIG. 6 is a schematic principle diagram of a training method for an image processing model by using a related technology according to an embodiment of this disclosure. Decoders that use a face A and a face B as target faces of training are used as an example. An encoder and a decoder A form a self-encoding network A, and the self-encoding network A is trained without supervision based on distorted images of different sample images (e.g., images with different resolutions and different styles) of the face A, to update parameters of the encoder and the decoder A, until the encoder is capable of encoding the face A to obtain a dimension-reduced feature of the face A. The decoder A is configured to perform decoding based on the dimension-reduced feature of the face A, to reconstruct an image of the face A. Similarly, a self-encoding network B is trained without supervision based on distorted images of different sample images of the face B, to update parameters of the encoder and the decoder B, until the encoder is capable of encoding the face B to obtain a dimension-reduced feature of the face B. The decoder B is configured to perform decoding based on the dimension-reduced feature of the face B, to reconstruct an image of the face B.

It may be understood that for training of the image processing model shown in FIG. 1, the application of the training method provided by the related technology relates to training of the self-encoding network A and the self-encoding network B. In a process of training each self-encoding network, the parameters of the encoder and the decoder need to be updated separately. An exemplary description is provided below.

In a process of training the self-encoding network A, a loss function of the self-encoding network A is expressed as:

loss_A=Σ(decoder_A(encoder(warp($x_1$)))−$x_1$)$^2$, where decoder_A denotes the decoder A, warp denotes a function for face distortion, $x_1$ denotes the face A, and encoder denotes the encoder.

In an iterative training process, the face A is substituted into the loss function of the self-encoding network A, to solve the parameters of the encoder and the decoder A when the loss function descends according to a gradient (e.g., a maximum gradient). When the loss function converges, the training ends.

In a process of training the self-encoding network B, a loss function of the self-encoding network B is expressed as: loss_B=$\Sigma$(decoder_B(encoder(warp($x_2$)))−$x_2$)$^2$, where decoder_B denotes the decoder B, warp denotes a function of a distorted face, $x_2$ denotes the face B, and encoder denotes the encoder.

In an iterative training process, the face B is substituted into the loss function of the self-encoding network B, to solve the parameters of the encoder and the decoder B when the loss function descends according to a gradient (e.g., a maximum gradient). When the loss function converges, the training ends.

With reference to the foregoing analysis, the application of the related technology in training the image processing model according to this embodiment of this disclosure can have the following problems:

1. Adjustment of the Image Processing Model can have High Costs.

After an image processing model with the face A and the face B (target faces) as target faces is formed, if the image processing model further needs to process face swapping with a face C and a face D as target faces, parameters of a self-encoding network formed by the encoder and the face C as well as a self-encoding network formed by the encoder and the face D need to be adjusted by using samples of the face C and the face D. Because the encoder and the decoder are connected in series, the gradient becomes small when being propagated from the decoder to the encoder. Consequently, iterative training needs to be performed many times, which is relatively time-consuming.

2. Training can Require a Large Amount of Data.

Because the encoder has a large quantity of parameters, a lot of training samples need to be provided for training of the encoder in the training process. For example, when a to-be-replaced face needs to be replaced with a target face, a large quantity of samples of the target face need to be acquired, including samples with different angles, expressions, illumination, and the like. It is usually difficult to obtain such rich samples, thus affecting a face swapping effect of the image processing model.

Figure 7:
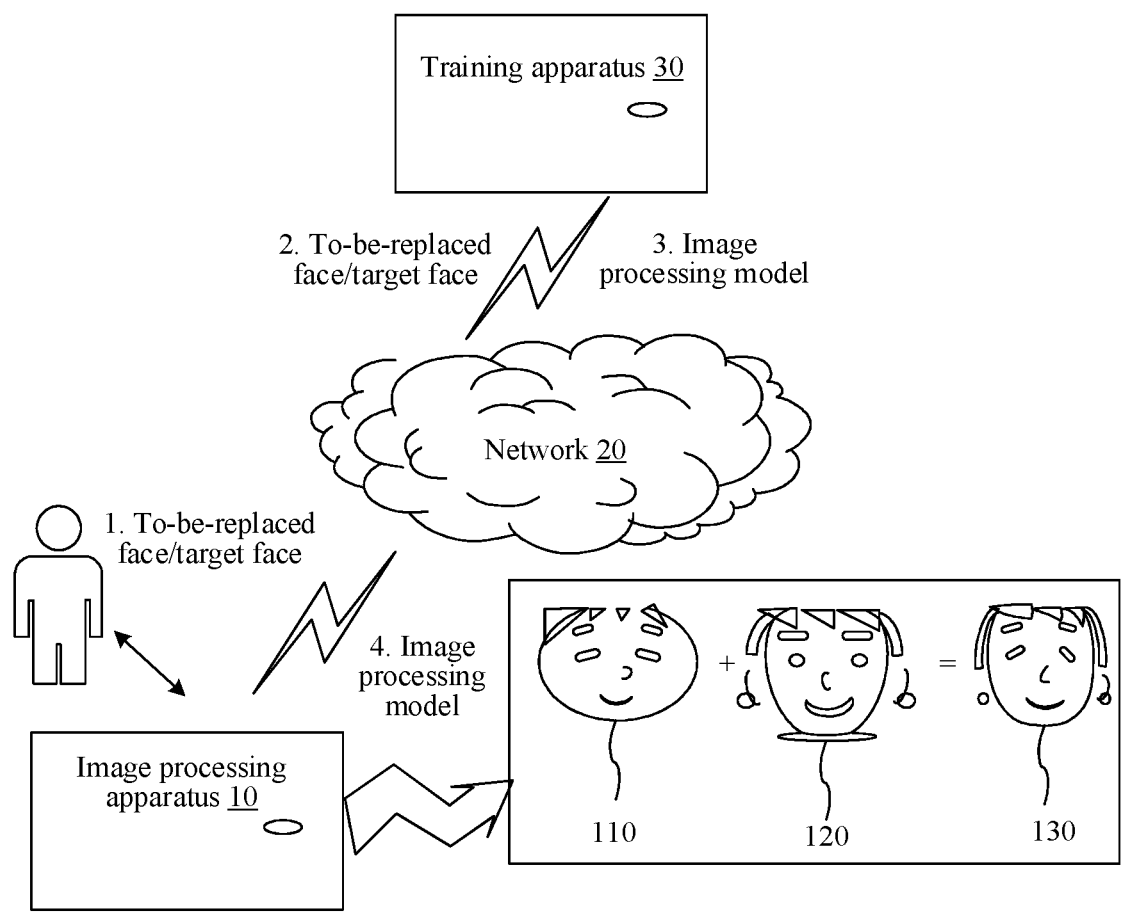
FIG. 7 is a schematic diagram of a usage scenario of a training method and application method for an image processing model according to an embodiment of this disclosure.

To resolve the above problems, an embodiment of this disclosure provides a training method and training apparatus for an image processing model, and an image processing method and image processing apparatus for an image processing model. For example, FIG. 7 is a schematic diagram of a usage scenario of a training method and an application method for an image processing model according to an embodiment of this disclosure. To support an exemplary application, a training apparatus 30 for an image processing model for implementing this embodiment of this disclosure may be a server, and an image processing apparatus 10 for implementing this embodiment of this disclosure may be a terminal running various clients. The training apparatus 30 is connected to the image processing apparatus 10 through a network 20, and the network 20 may be a wide area network, a local area network, or a combination of the wide area network and the local area network, and data transmission is implemented by using a wireless link. The image processing apparatus 10 submits training tasks for different target faces; the training apparatus 30 trains a corresponding image processing model, and delivers parameters of the image processing model to the image processing apparatus 10.

For example, a video client may be run in a graphical interface of the image processing apparatus 10, and the video client is capable of submitting a corresponding training task to the training apparatus 30 according to a to-be-replaced face 120 and a target face 110 that are indicated by a user in a playing interface in various man-machine interaction manners (e.g., a gesture and a voice). The training apparatus 30 completes the training task of the image processing model and delivers corresponding parameters to the video client. The video client reconstructs a target face 130 having the same style as the to-be-replaced face 120 by running the image processing model. In a frame image of the to-be-replaced face 120 that appears after decoding, the to-be-replaced face 120 in a video is replaced with the reconstructed target face 130, to form a face-swapped effect of the video.

It may be understood that the video decoding processing may also be migrated to the server. The replaced frame image is re-encoded by using a hardware resource of the server, to form a video having a face-swapped effect.

Figure 8:
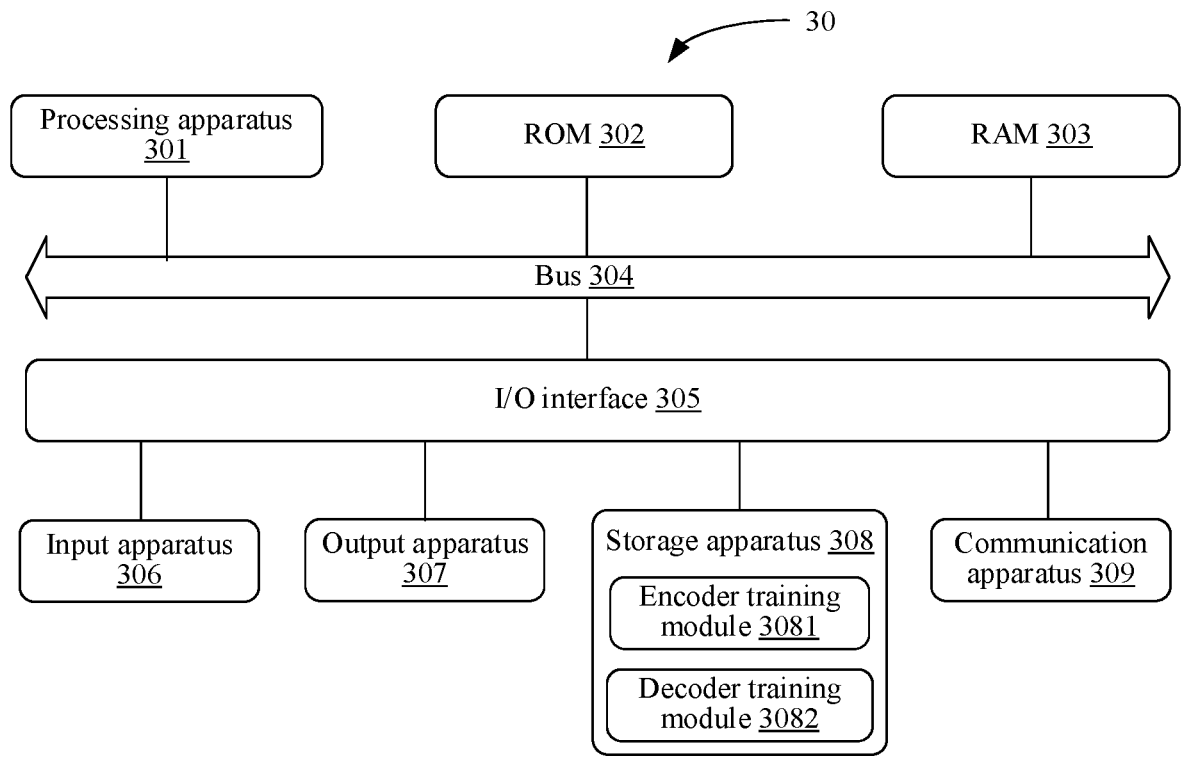
FIG. 8 is a schematic structural diagram of a training apparatus for training an image processing model according to an embodiment of this disclosure.

A hardware structure of the training apparatus for implementing this embodiment of this disclosure can be described with reference to the accompanying drawings, and the training apparatus for implementing this embodiment of this disclosure may be a server or various types of terminals. FIG. 8 is a schematic structural diagram of a training apparatus 30 for training an image processing model according to an embodiment of this disclosure. Description is provided with reference to the structure shown in FIG. 8.

The training apparatus 30 provided by this embodiment of this disclosure may include a processing apparatus 301 (e.g., a processor or processing circuitry such as a central processing unit (CPU) and graphics processing unit (GPU)). The processing apparatus 301 can perform various proper actions and processing according to a program stored in a read-only memory (ROM) 302 or a program loaded from a storage apparatus 308 into a random access memory (RAM) 303. An example of the program may include an encoder training module 3081 and a decoder training module 3082. One or more of the modules can be implemented by processing circuitry, software, or a combination thereof, for example.

The RAM 303 further stores various programs and data required for operations of the training apparatus 30. The processing apparatus 301, the ROM 302, and the RAM 303 are connected to each other through a bus 304. An input/output (I/O) interface 305 is also connected to the bus 304.

Generally, the following apparatuses may be connected to an I/O interface 305: an input apparatus 306 including, for example, a touchscreen, a touchpad, a keyboard, a mouse, a camera, a microphone, an accelerometer, and a gyroscope; an output apparatus 307 including, for example, a liquid crystal display (LED), a speaker, and a vibration device; and a storage apparatus 308 including, for example, a magnetic tape and a hard disk.

A communication apparatus 309 may allow the training apparatus 30 to communicate with other devices in a wireless or wired manner to exchange data. Although the training apparatus 30 having various apparatuses is shown in FIG. 8, it is to be understood that the training apparatus 30 is not required to implement or have all of the apparatuses shown. More or fewer apparatuses may alternatively be implemented or included.

Figure 9:
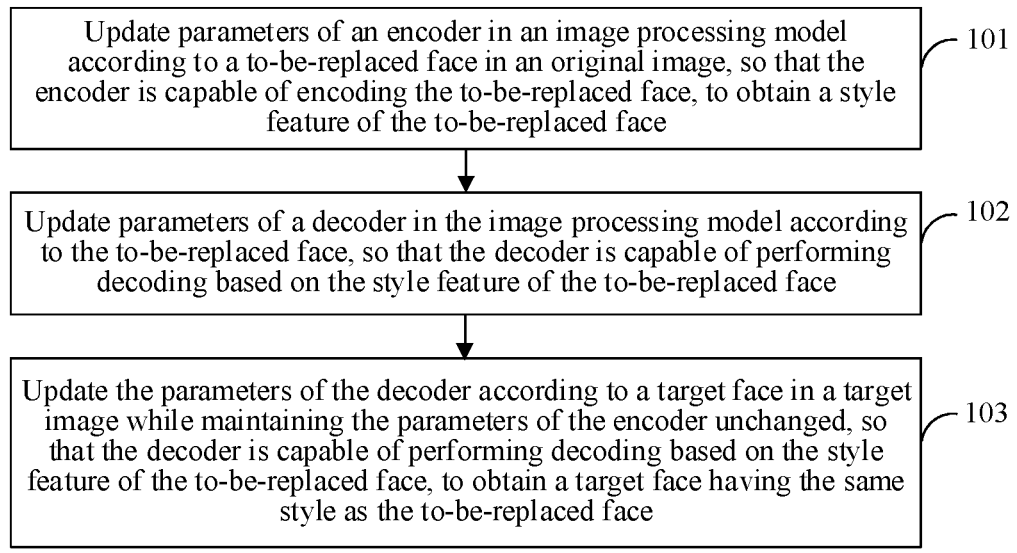
FIG. 9 is a schematic flowchart of a training method for an image processing model according to an embodiment of this disclosure.

The image processing method for an image processing model provided in an embodiment of this disclosure is described with reference to the training apparatus 30 shown in FIG. 8. FIG. 9 is a schematic flowchart of a training method for an image processing model according to an embodiment of this disclosure. It may be understood that, steps shown in FIG. 9 may be performed by the training apparatus 30 running on a terminal. For example, the training apparatus 30 may be a terminal, or a functional module coupled to an internal/external interface in the terminal. The steps shown in FIG. 9 may alternatively be performed by the training apparatus 30 running on a server, for example, the training apparatus 30 may be a server, or a functional module coupled to an internal/external interface in the server. The following describes the steps shown in FIG. 9.

In step 101, parameters of an encoder in an image processing model can be updated according to a to-be-replaced face in an original image, so that the encoder is capable of encoding the to-be-replaced face, to obtain a style feature of the to-be-replaced face.

Before the image processing model is trained, an initial structure of the image processing model only includes one encoder and one decoder, and the decoder can also be referred to as a temporary decoder before the decoder is trained for a target face. Before a corresponding decoder is trained in the image processing model for the target face, the encoder needs to be initialized (e.g., updating parameters of the encoder) first.

In some embodiments, the encoder and the temporary decoder form a self-encoding network, and unsupervised training is performed on the self-encoding network to update the parameters of the encoder. The self-encoding network has such a characteristic: an inputted face image is encoded (e.g., compressed) by the encoder to obtain an image with lower-dimensional features, and the features represent a visual characteristic of the face rather than noise; and the decoder is used for restoring (e.g., reconstructing) the inputted face image to the greatest extent based on the features. Therefore, by training the self-encoding network, the encoder may be capable of extracting the style feature from the to-be-replaced face in the original image.

For example, a loss function of the self-encoding network is used for quantitatively representing a difference between a facial image in a distorted original image and a facial image reconstructed by the decoder. Therefore, when the facial image of the to-be-replaced face in the distorted original image (the distorted original image is obtained by distorting the original image) is substituted into the loss function corresponding to the self-encoding network formed by the encoder and the decoder, the parameters corresponding to the encoder when the loss function satisfies the convergence condition may be determined. The convergence condition may be that the loss function is lower than a loss function threshold, or, a quantity of times of iterative training of the self-encoding network reaches a threshold for the number of iterations.

In step 102, parameters of a decoder in the image processing model can be updated according to the to-be-replaced face in the original image, so that the decoder is capable of performing decoding based on the style feature of the to-be-replaced face.

As described above, in an initialization stage of the encoder, because the self-encoding network formed by the encoder and the temporary decoder is trained, in a process of training the self-encoding network, the parameters of the decoder are also updated simultaneously. In this case, the decoder is capable of obtaining a reconstructed to-be-replaced face when performing decoding based on the style feature of the to-be-replaced face. That is, when the facial image of the to-be-replaced face in the distorted original image is substituted into the loss function corresponding to the self-encoding network formed by the encoder and the decoder, to determine the parameters corresponding to the encoder when the loss function satisfies the convergence condition, parameters of the temporary decoder when the loss function satisfies the convergence condition may be determined at the same time.

After the self-encoding network formed by the encoder and the temporary decoder is trained, the encoder can be capable of extracting the style feature from the inputted face image, even if the temporary decoder needs to be trained to be capable of restoring different target faces from style features, it is unnecessary to further adjust the parameters of the encoder, thereby reducing samples and the training time, and improving overall efficiency of subsequently training the decoder by using samples of the target face.

To improve the efficiency of model training, before the parameters of the encoder in the image processing model are updated according to the to-be-replaced face in the original image, various types of initialization processing may be further performed on the to-be-replaced face in the original image.

In some embodiments, the initialization processing may include: in a data acquisition stage, for an acquired sample image set including the to-be-replaced face, capturing the original image including the to-be-replaced face from each sample image; and aligning each captured original image based on feature points of the to-be-replaced face. Therefore, the encoder is capable of accurately learning style features of a face.

In some embodiments, the initialization processing may include: performing random augmentation on the original image; performing random distortion on the original image on which the random augmentation has been performed, to obtain a distorted original image; and capturing a facial image of a to-be-replaced face in the distorted original image, and scaling up/down the captured facial image, to adapt to an input resolution supported by the encoder during update of the parameters of the encoder.

In an example, random augmentation may be performed on the original image in the following manner: performing random rotation based on a center of the original image; performing random scaling on the original image obtained after the random rotation; and performing random translation on the original image obtained after the random scaling.

In an example, random distortion may be performed on the original image, on which the random augmentation has been performed, in the following manner: inserting noise into the original image on which the random augmentation has been performed, the noise including at least one of fixed noise (e.g., a fixed color value) and dynamic noise (e.g., a changed color value).

For the manner of inserting the dynamic noise into the original image on which random augmentation has been performed, the original image on which the random augmentation has been performed may be gridded, and coordinates are allocated to at least some nodes or all nodes, and noise is added to the coordinate according to Gaussian distribution. Image interpolation (e.g., linear interpolation or nonlinear interpolation) may be performed on a region other than the nodes to enlarge a size of the original image, and when the linear interpolation is adopted, a value of an interpolated pixel may be positively correlated with a value of the coordinate.

In an example, for the manner of capturing the facial image of the to-be-replaced face from the distorted original image, a center of the distorted original image may be used as a geometric center, a certain proportion of an image of the to-be-replaced face may be captured with various shapes (e.g. a circle, an oval, and a rectangle) as a facial image (generally, when a capturing ratio exceeds 62.5%, it can be ensured that a complete facial image is captured).

After the initialization of the encoder is completed, the temporary decoder may be trained pertinently for different target faces, which is described in step 103.

In step 103, the parameters of the decoder can be updated according to a target face in a target image while maintaining the parameters of the encoder unchanged, so that the decoder is capable of performing decoding based on the style feature of the to-be-replaced face, to obtain a target face having the same style as the to-be-replaced face.

It may be understood that, according to the initialization processing for the original image described above, similar processing may be performed on the target image. For example, similar initialization processing and random augmentation are performed on the target image, and random distortion is performed on the target image on which the random augmentation has been performed, to obtain a distorted target image; and a facial image in the target image is captured.

In some embodiments, after the initialization of the encoder is completed, if a decoder corresponding to the target face needs to be trained, while the parameters of the encoder are maintained unchanged, the self-encoding network formed by the encoder and the temporary decoder is trained by using a facial image of a target face in a distorted target image (which is obtained by distorting the target image), to further update the parameters of the temporary decoder until the loss function of the self-encoding network satisfies the convergence condition.

When corresponding decoders are trained for different target faces, updating is performed based on the parameters of the temporary decoder after the encoder is initialized, so that the temporary decoder does not learn an ability to simultaneously restore a plurality of target faces, thereby ensuring precision of target face reconstruction.

For example, a training target is the decoder A in the image processing model shown in FIG. 1. The decoder A is configured to reconstruct the target face A. A facial image of the target face in the distorted target face A is substituted into a loss function corresponding to a self-encoding network formed by the encoder and the temporary decoder. While the parameters of the encoder are maintained unchanged, the parameters of the temporary decoder when the loss function satisfies the convergence condition are determined, and the parameters are used as parameters of the decoder A corresponding to the target face. Because a structure of the decoder A is a priori, determining the parameters of the decoder A is equivalent to determining the decoder A.

Similarly, when a training target is the decoder B in the image processing model shown in FIG. 1, the decoder B is configured to reconstruct the target face B. A facial image of the target face in the distorted target face B is substituted into a loss function corresponding to a self-encoding network formed by the encoder and the temporary decoder. While the parameters of the encoder are maintained unchanged, the parameters of the temporary decoder when the loss function satisfies the convergence condition are determined, and the parameters are used as parameters of the decoder B corresponding to the target face.

In some embodiments, after the image processing model is trained, an operation of face swapping shown in FIG. 7 may be performed by using the image processing model. A to-be-replaced face 120 image is encoded by using the encoder to obtain a style feature of the to-be-replaced face 120, and the style feature of the to-be-replaced face 120 is inputted to the decoder trained for the target face 110; in the decoder of the target face 110, decoding is performed based on the style feature of the to-be-replaced face 120, to obtain a target face 130 having the same style as the to-be-replaced face 120, thereby implementing an effect of face swapping.

A structure of the training apparatus for implementing an embodiment of this disclosure is described with reference to the accompanying drawing, and the training apparatus for implementing this embodiment of this disclosure may be a server or various types of terminals.

Figure 10:
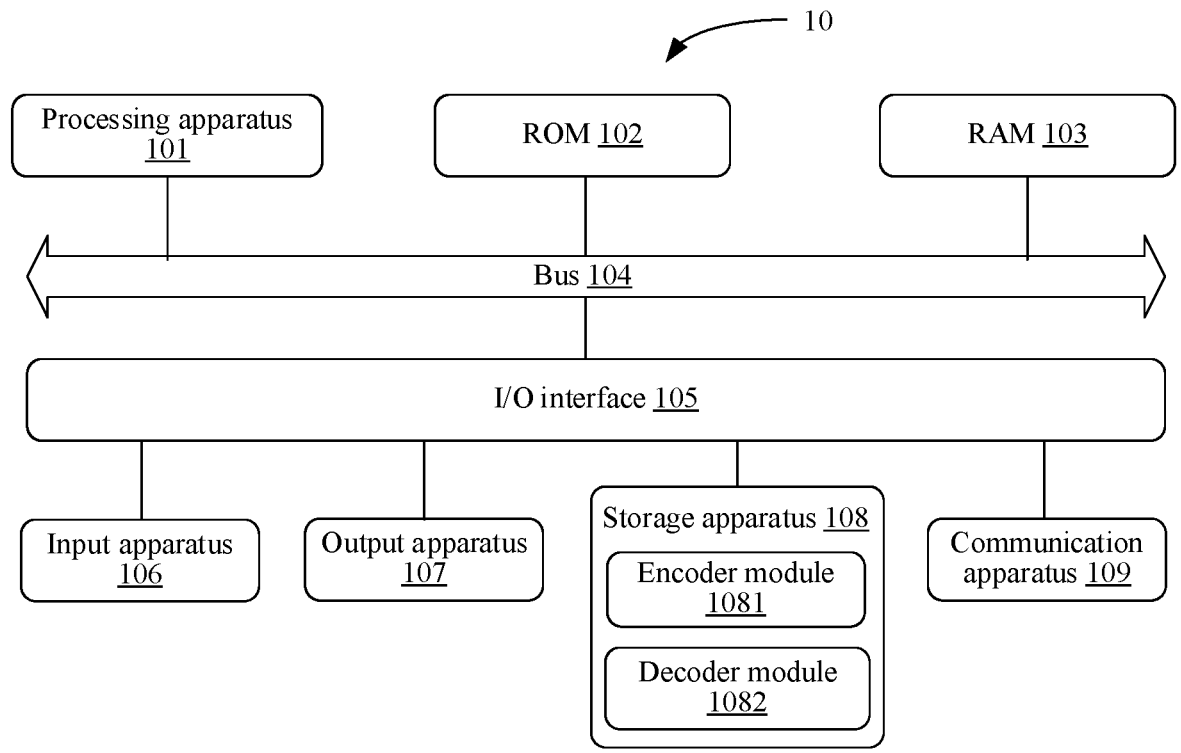
FIG. 10 is an exemplary schematic structural diagram of an image processing apparatus according to an embodiment of this disclosure.

FIG. 10 is an exemplary schematic structural diagram of an image processing apparatus 10 according to an embodiment of this disclosure. According to the foregoing description of FIG. 8, it is to be understood that the image processing apparatus 10 in this embodiment of this disclosure may include a processing apparatus 101, a ROM 102, a RAM 103, a bus 104, an I/O interface 105, an input apparatus 106, and an output apparatus 107. In addition, in an example, the program stored in a storage apparatus 108 may include an encoder module 1081 and a decoder module 1082. One or more of the modules can be implemented by processing circuitry, software, or a combination thereof, for example.

Figure 11:
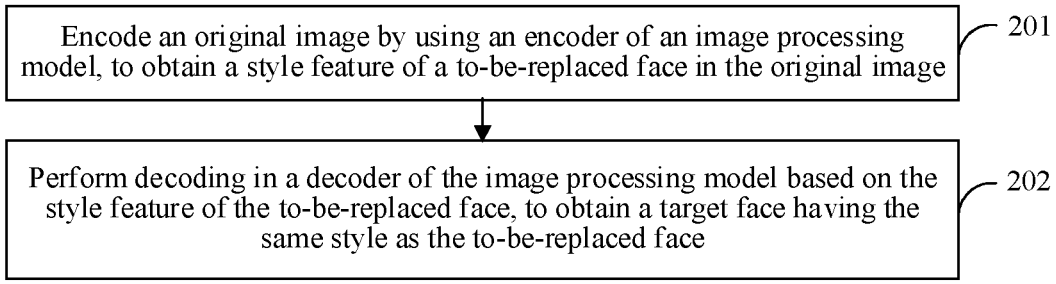
FIG. 11 is a schematic flowchart of an image processing method for an image processing model according to an embodiment of this disclosure.

The image processing method for an image processing model provided in this embodiment of this disclosure is described with reference to the image processing apparatus 10 shown in FIG. 10. FIG. 11 is a schematic flowchart of an image processing method for an image processing model according to an embodiment of this disclosure. It may be understood that, steps shown in FIG. 11 may be performed by the image processing apparatus 10 running on a terminal, where the image processing apparatus 10 may be a terminal, or a functional module coupled to an internal/external interface in the terminal. The steps shown in FIG. 11 may alternatively be performed by the image processing apparatus 10 running on a server, where the image processing apparatus 10 may be a server, or a functional module coupled to an internal/external interface in the server. The following describes the steps shown in FIG. 11.

In step 201, an original image is encoded by using an encoder of an image processing model, to obtain a style feature of a to-be-replaced face in the original image.

In step 202, decoding is performed in a decoder of the image processing model based on the style feature of the to-be-replaced face, to obtain a target face having the same style as the to-be-replaced face.

It can be seen according to the training solution of the image processing model that, because the parameters of the decoder are obtained by performing update according to the style feature of the target image while maintaining the parameters of the encoder unchanged, when a decoder corresponding to a new target face needs to be added to the image processing model, the encoder does not need to be further trained. On the one hand, it is unnecessary to set a large quantity of sample images corresponding to target faces for the encoder, thereby reducing the training time of the image processing model, and on the other hand, only corresponding decoders are trained pertinently for the target faces, thereby further reducing the training time.

The encoder training module 3081 and the decoder training module 3082 shown in FIG. 8 are further described.

The encoder training module 3081 is configured to update parameters of an encoder in an image processing model according to a to-be-replaced face in an original image, so that the encoder is capable of encoding the to-be-replaced face, to obtain a style feature of the to-be-replaced face.

The decoder training module 3082 is configured to update parameters of a decoder in the image processing model according to the to-be-replaced face in the original image, so that the decoder is capable of performing decoding based on the style feature of the to-be-replaced face; and update the parameters of the decoder according to the style feature of the target face in the target image while maintaining the parameters of the encoder unchanged, so that the decoder is capable of performing decoding based on the style feature of the to-be-replaced face, to obtain a target face having the same style as the to-be-replaced face.

In some embodiments, the encoder training module 3081 is specifically configured to: substitute a facial image of a to-be-replaced face in a distorted original image into a loss function corresponding to a self-encoding network, and determine the parameters corresponding to the encoder when the loss function satisfies a convergence condition, the decoder being capable of obtaining a reconstructed to-be-replaced face when performing decoding based on the style feature of the to-be-replaced face. The distorted original image is obtained by distorting the original image.

In some embodiments, the decoder training module 3082 is specifically configured to: substitute the facial image of the to-be-replaced face in the distorted original image into the loss function corresponding to the self-encoding network, and determine the parameters corresponding to the decoder when the loss function satisfies the convergence condition, the distorted original image being obtained by distorting the original image.

In some embodiments, the decoder training module 3082 is specifically configured to: encode the facial image of the target face in the target image by using the encoder when the image processing model includes at least two decoders and the decoders respectively correspond to different target faces, to obtain the style feature of the target face corresponding to the decoder; substitute the style feature of the target face corresponding to the decoder into the loss function corresponding to the self-encoding network formed by the encoder and the decoder, and determine the parameters corresponding to the decoder when the loss function satisfies the convergence condition.

In some embodiments, the encoder training module 3081 is further configured to: capture, from sample images of a sample image set before the parameters of the encoder in the image processing model are updated according to the to-be-replaced face in the original image, the original image including the to-be-replaced face; and align each captured original image based on feature points of the to-be-replaced face.

In some embodiments, the encoder training module 3081 is further configured to: perform random augmentation on the original image before the parameters of the encoder in the image processing model are updated according to the to-be-replaced face in the original image; perform random distortion on the original image on which the random augmentation has been performed, to obtain a distorted original image; and capture a facial image of the to-be-replaced face in the distorted original image, and scale up/down the captured facial image, to adapt to an input resolution supported by the encoder during update of the parameters of the encoder.

In some embodiments, the encoder training module 3081 is specifically configured to: perform random rotation based on a center of the original image; perform random scaling on the original image obtained after the random rotation; and perform random translation on the original image obtained after the random scaling.

In some embodiments, the encoder training module 3081 is specifically configured to: insert noise into the original image on which the random augmentation has been performed, the noise including at least one of fixed noise and dynamic noise.

In some embodiments, the encoder training module 3081 is specifically configured to: perform gridding on the original image on which the random augmentation has been performed, and allocate coordinates to at least some nodes in a grid; and add noise corresponding to the allocated coordinates to the at least some nodes.

In some embodiments, the decoder training module 3082 is specifically configured to: perform random augmentation on the target image; perform random distortion on the target image on which the random augmentation has been performed, to obtain a distorted target image; and capture the facial image in the target image.

In some embodiments, the decoder training module 3082 is further configured to invoke the encoder to perform the following processing: encoding a to-be-replaced image, to obtain a style feature of a to-be-replaced face in the to-be-replaced image, and inputting the style feature to the decoder; and the decoder training module 3082 is further configured to invoke the decoder to perform the following processing: performing decoding based on the style feature of the to-be-replaced face, to obtain a target face having the same style as the to-be-replaced face.

The encoder module 1081 and the decoder module 1082 shown in FIG. 10 are further described. The encoder module 1081 is configured to encode an original image, to obtain a style feature of a to-be-replaced face in the original image. The decoder module 1082 is configured to perform decoding based on the style feature of the to-be-replaced face, to obtain a target face having the same style as the to-be-replaced face, where the decoder module 1082 is obtained by performing update according to a target image including the target face while maintaining parameters of the encoder module 1081 unchanged.

The embodiments of this disclosure further provide a computer-readable storage medium storing a computer program. For example, the computer-readable storage medium can be a non-transitory computer-readable storage medium. The computer-readable storage medium may be included in the training apparatus 30/image processing apparatus 10, or may exist alone and is not disposed in the training apparatus 30/image processing apparatus 10. The computer-readable storage medium carries one or more computer programs, the one or more computer programs, when performed by the training apparatus 30/image processing apparatus 10, causing the training apparatus 30/image processing apparatus 10 to implement the training method and image processing method for an image processing model provided in the embodiments of this disclosure.

Description is provided in the following by using an example of training and applying an image processing model (which may alternatively be referred to as a face swapping model) for face swapping.

Figure 12:
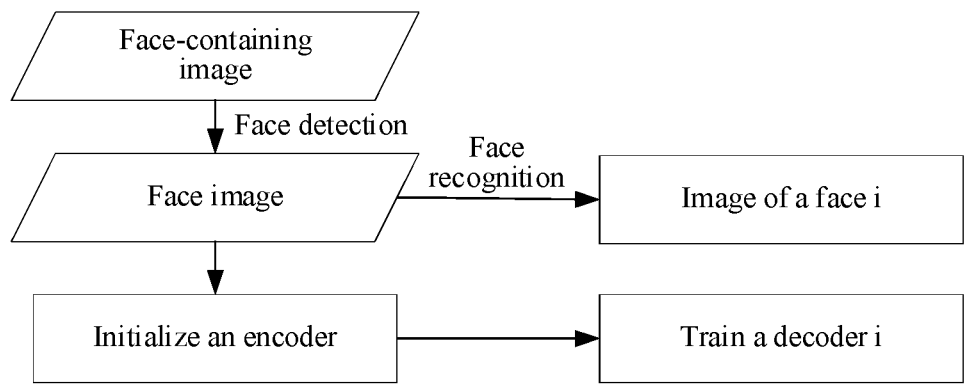
FIG. 12 is a schematic principle diagram of training an image processing model for face swapping according to an embodiment of this disclosure.

FIG. 12 is a schematic principle diagram of training an image processing model for face swapping according to an embodiment of this disclosure. Before the image processing model is trained, an initial structure of the image processing model only includes one encoder and one temporary decoder.

During training, initialization is first performed on the encoder. For an image including a face, a face image is captured through face detection. The face image is used as a sample, and a self-encoding network formed by the encoder and the temporary decoder is trained, so that after encoding (e.g., feature extraction/dimension reduction) the sample of the face image, the self-encoding network is capable of reconstructing the face image by using a style feature obtained through encoding.

During initialization of the encoder, parameters of the temporary decoder are synchronously updated. After the encoder is initialized, different faces recognized from the face image may be used as target faces to train corresponding decoders. The decoders corresponding to different target faces are obtained by training based on the parameters of the temporary decoder after the encoder is initialized.

For example, a decoder i corresponding to a face i is trained (i is an integer greater than or equal to 1). Parameters of the encoder are maintained unchanged, an image of the face i is used as a sample, and the self-encoding network formed by the encoder and the temporary decoder is trained, to update the parameters of the temporary decoder. The parameters of the temporary decoder are used as parameters of the decoder i after training is completed, that is, the decoder i is obtained.

The following separately describes the encoder initialization, training of the decoder for the target face, and corresponding application.

Figure 13A:
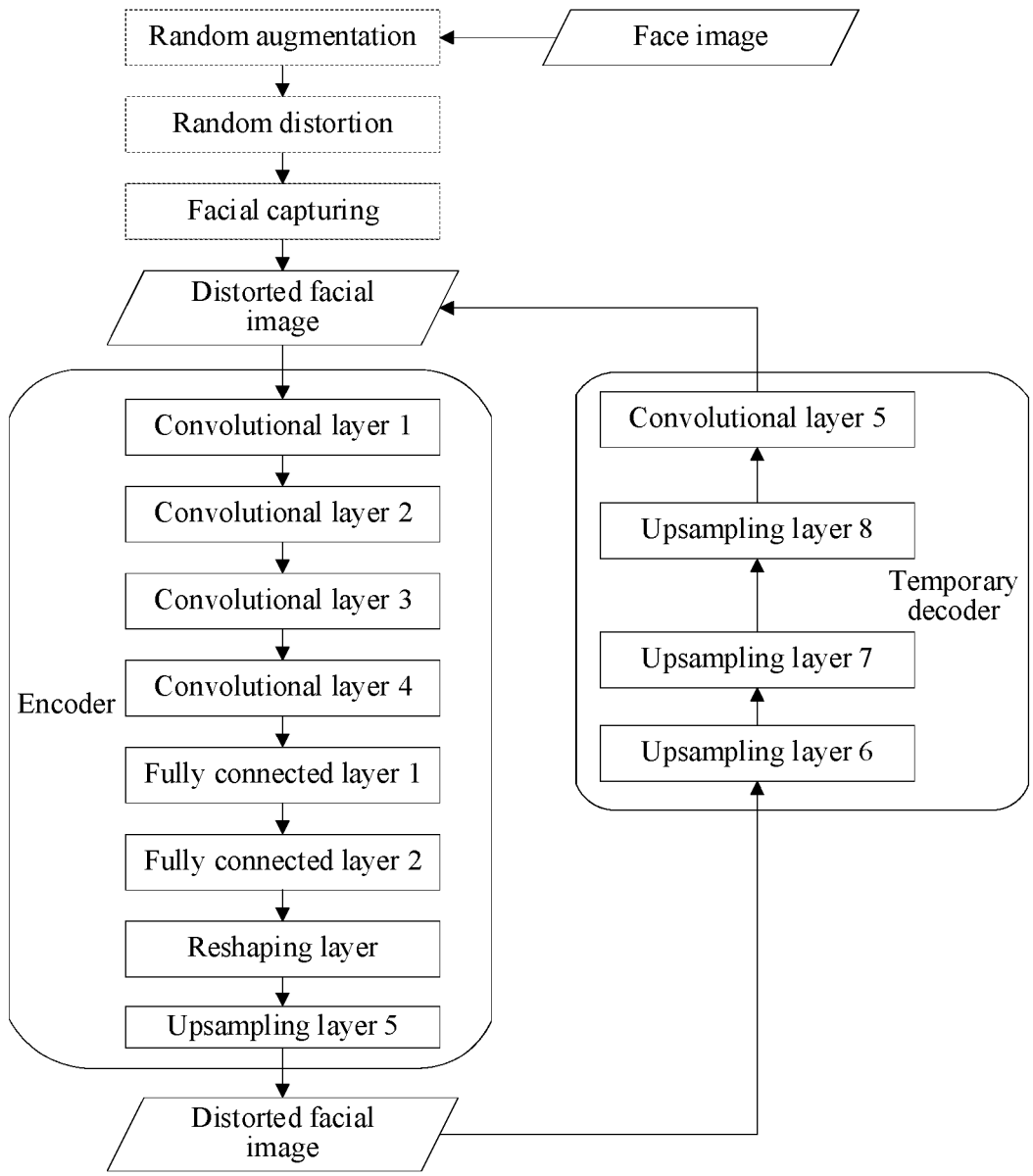
FIG. 13A is a schematic principle diagram of a training method for an image processing model according to an embodiment of this disclosure.

FIG. 13A is a schematic principle diagram of a training method for an image processing model according to an embodiment of this disclosure. Descriptions are provided with reference to FIG. 13A.

Before an encoder is initialized, face image data first needs to be obtained in the following manner: box-selecting a face position by using a face detection algorithm; marking feature points of a face, such eyes, a mouth, and a nose, by using a facial feature positioning algorithm; and capturing a face image according to the detected face position, and aligning the captured face images based on the feature points (e.g., eyes). An exemplary resolution of the face image may be 512*512 (pixels).

Various types of initialization processing are further performed on the face image before the encoder is initialized, including random augmentation, random distortion, and facial feature capturing. Separate descriptions are provided below.

Random augmentation includes: performing random rotation on the face image by using an image center as a rotation center, where a rotation angle range being a, for example, a value range of a is 0 degrees to 30 degrees; performing random stretch on a width and a height of the rotated face image, a straightening multiple being between [1−β, 1+β], for example, 0.01; and performing corresponding random translation on the face image in a vertical direction and a horizontal direction for θ1 and θ2, where for example, values of θ1 and θ2 correspond to 1% of the width and 1% of the height of the face image.

After the random augmentation is performed, random distortion processing may be further performed on the face image in the following manner: drawing a grid; adding coordinate noise; and remapping the image, which are respectively described in the following.

Figure 13B:
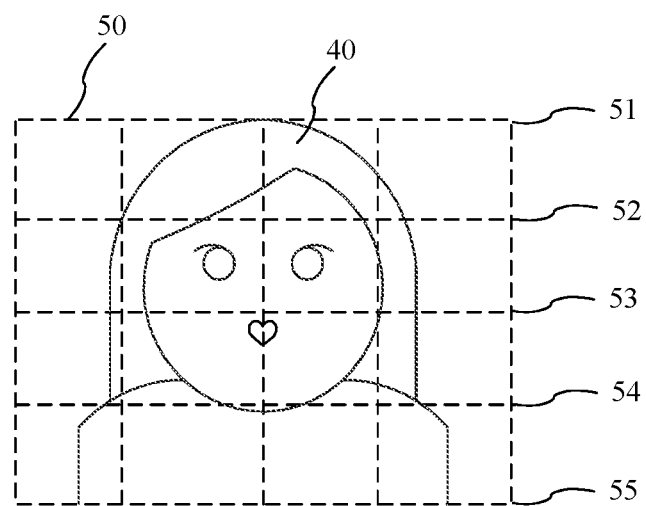
FIG. 13B is a schematic diagram of drawing a grid in a face image according to an embodiment of this disclosure.

FIG. 13B is a schematic diagram of drawing a grid 50 in a face image 40 according to an embodiment of this disclosure. When a grid is drawn, it is assumed that a captured face image 40 is a square image, which is denoted by I, and a width and a height are both W. A uniform grid 50 with a density of N (representing an integer quantity of nodes in the grid)*N is drawn in the face image 40. For example, the density of the grid is 5*5 (e.g., there are five nodes in a width direction and five nodes in a height direction). FIG. 13B exemplarily shows a node 51 to a node 55.

When coordinate noise is added, coordinates (x, y) are allocated to each node. Coordinates of an $i^{th}$ row and a $j^{th}$ column (in FIG. 13B, value ranges of i and j are 1 to 5) are $(x_{ij}, y_{ij})$, $x_{ij}$=i/N, and $y_{ij}$=j/N. Therefore, all $x_{ij}$ (i=1, ..., and 5, j=1, ..., and 5) and $y_{ij}$ (i=1, ..., 5, j=1, ..., 5) form a matrix (X, Y). Independently distributed gaussian noise is separately added to each element in (X, Y), an expectation of the gaussian noise is 0, a variance is $\sigma^2$, and an exemplary value of the variance is 0.02. A width and a height of the matrix (X, Y) are scaled up to W by using an image interpolation method (for example, linear interpolation), to obtain a new image (e.g., a matrix) (X', Y'). A matrix (X2, Y2) with a width of W and a height of W is constructed, an element $x2_{ij}$ of the matrix X2 is equal to i/W, and an element $y2_{ij}$=j/W in the matrix Y2 is equal to j/W. i=1, W, and j=1, ..., W.

When the image is remapped, interpolation is performed on the face image to which the contract noise has been added, to obtain a distorted face image Z. A pixel in an $a^{th}$ row and a $b^{th}$ column of Z is denoted by $z_{ab}$, an element less than $x_{ab}$ is searched for from the matrix X2 and is denoted by $x2_c$, and an element less than $y_{ij}$ is searched for from the matrix Y2 and is denoted by $x2_d$. Therefore, the following four points may be constructed: A $(x2_{c,d}, y2_{c,d})$, B $(x2_{c+1,d}, y2_{c+1,d})$, C $(x2_{c,d+1}, y2_{c,d+1})$, D $(x2_{c+1,d+1}, y2_{c+1,d+1})$. Distance dA, dB, dC, and dD between a point $(x_{ab}, y_{ab})$ and A, B, C, and D are separately calculated, and a value of $z_{ab}$ is obtained by weighting according to the four distances: $z_{ab}$=dA/(dA+dB+dC+dD)*$I_{c,d}$+dB/(dA+dB+dC+dD)*$I_{c+1,d}$+dC/(dA+dB+dC+dD)*$I_{c,d+1}$+dD/(dA+dB+dC+dD)*$I_{c+1,d+1}$.

Before the encoder is initialized, a facial image needs to be captured from the randomly distorted face image. An image at a fixed position in the middle of the distorted face image is captured, and a capturing percentage is, for example, 62.5%. Then, the image is scaled to obtain an input resolution supported by the encoder. For example, a width and a height of the randomly distorted image are 512*512. A facial image having a quantity of width lines and a quantity of height lines within (48, 208) is captured, and then an obtained 161*161 facial image is scaled to obtain a 64*64 facial image.

In a stage of initializing the encoder, initialization processing such as the random augmentation, the random distortion, and the facial capturing is performed on all face images detected in a data set, to obtain samples of facial images, and the samples of the facial images are used for training the self-encoding network shown in FIG. 13A to initialize the encoder. An exemplary structure of the encoder in FIG. 13A is shown in FIG. 2 and Table 1, and is certainly not limited thereto. For example, channels and quantities of convolutional layers, fully connected layers, and upsampling layers may be changed flexibly.

A training objective of the self-encoding network is to encode a feature of an inputted distorted facial image, and then reconstruct the distorted facial image by using the encoded feature. For example, an output of a network of the encoder includes only 1024 nerve cells, while an inputted distorted face has 12288 dimensions. Through training, the encoder is capable of reserving as many features of the inputted distorted facial image as possible, so that when the face swapping model is trained subsequently, the parameters of the encoder do not need to be fine-tuned.

The encoder is denoted by Encoder(x), and x denotes the inputted distorted facial image. The temporary decoder is denoted by Decoder_tmp(f), and f denotes an output (e.g., Encoder (x)) obtained after x is encoded by the encoder. The loss function Loss_init may be expressed as follows: loss_init=$\Sigma$(Decoder_tmp(Encoder(x))−x)$^2$.

When loss_init is not remarkably reduced (e.g., less than a threshold of the loss function) during optimization, or when a quantity of iterations reaches a threshold for the quantity of iterations, initialization of the encoder is completed. The encoder is already capable of encoding any input face image to obtain a style feature, so that the parameters do not need to be adjusted subsequently.

Figure 14:
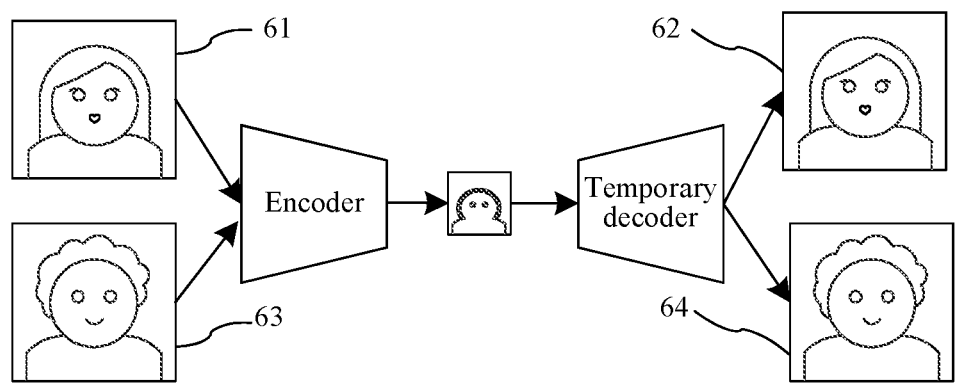
FIG. 14 is a schematic principle diagram of initializing an encoder according to an embodiment of this disclosure.

FIG. 14 is a schematic principle diagram of initializing an encoder according to an embodiment of this disclosure. After the initialization processing is performed on a face image 61 and a face image 63, distorted facial images in the face image 61 and the face image 63 are used for training a self-encoding network formed by an encoder and a temporary decoder. After training is completed, the temporary decoder is capable of reconstructing the distorted facial images in the face image 61 and the face image 63 based on features obtained through encoding by the encoder.

Figure 15:
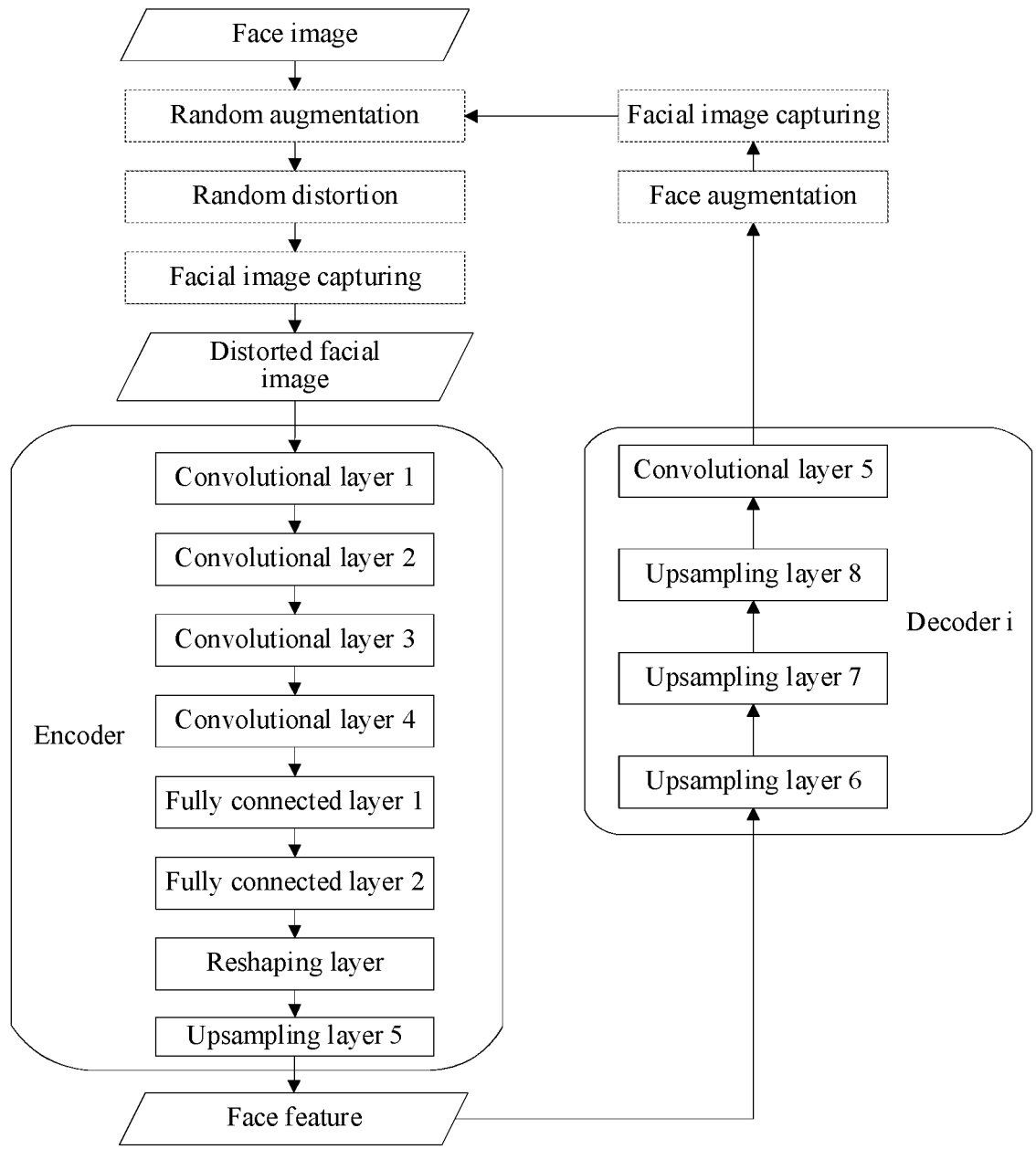
FIG. 15 is a schematic principle diagram of training a decoder according to an embodiment of this disclosure.

FIG. 15 is a schematic principle diagram of training a decoder according to an embodiment of this disclosure. A process of training the decoder is described with reference to FIG. 14.

For example, a decoder for a user i is trained. Face data of the user i is first obtained. 150 or more face images of the user i may be selected by using an algorithm automatic classification method or a manual classification method. Random augmentation, random distortion, and facial image capturing are performed according to the initialization solution in the foregoing description, to obtain distorted facial images.

A self-encoding network formed by an encoder and a decoder i (initial parameters of the decoder i are the same as the parameters of the temporary decoder) is trained by using the distorted facial images of the user i. During training, the parameters of the encoder do not need to be updated.

The encoder is denoted by Encoder(x), and x represents an inputted distorted facial image. The decoder i is denoted by Decoder i(f), and f is a feature obtained after x is encoded by the encoder. The parameters of the decoder Decoder_i are updated by using the following loss function loss_i: loss_i=$\Sigma$(Decoder_i(Encoder(x))−x)$^2$.

When the loss_i is not remarkably reduced (e.g., less than a threshold of the loss function), or when a quantity of iterations reaches a threshold for the quantity of iterations, training of the decoder i is completed.

Figure 16:
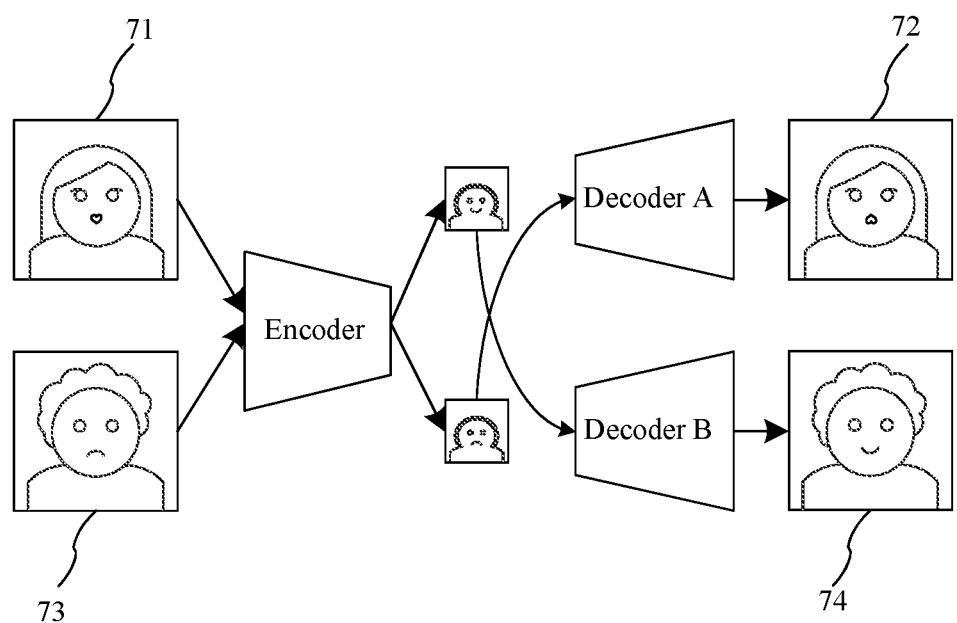
FIG. 16 is a schematic principle diagram of performing face swapping by using an image processing model according to an embodiment of this disclosure.

FIG. 16 is a schematic principle diagram of performing face swapping by using an image processing model according to an embodiment of this disclosure. The image processing model includes a decoder A trained for a user A and a decoder B trained for a user B.

When a face image 71 of the user A is inputted into an encoder, the encoder is capable of extracting a style feature of a face of the user A in the image 71. When the style feature is inputted into the decoder B, through training, the decoder B has a capability of reconstructing a face image of the user B based on the style feature. Therefore, the decoder B is capable of reconstructing, based on the style feature, a face image 74 of the user B having the same style feature. Similarly, when an image 73 of the user B is inputted into the encoder, the encoder is capable of extracting a style feature of the user B in the image 73. When the style feature is inputted into the decoder A, through training, the decoder A has a capability of reconstructing a face image of the user A based on the style feature. Therefore, the decoder A is capable of reconstructing, based on the style feature, a face image 72 of the user A having the same style feature.

Still referring to the application scenario shown in FIG. 7, the image processing apparatus 10 may run on a terminal, and the training apparatus 30 may run on a server for performing a training task. A user intends to replace a face (e.g., a to-be-replaced face 120) of a person in a video played in a video client of the terminal with a face (e.g., a target face 110) of the user, and play a video with a face-swapped effect (e.g., a target face 130) in the video client.

Therefore, the user has uploaded a face image (e.g., the target face) of the user to the server, selects a role in a video, and intends to replace a face of the role (e.g, a to-be-replaced face). The server trains an encoder and a decoder corresponding to a target object by using the training method for an image processing model (e.g., a face swapping model) provided in this embodiment of this disclosure.

Figure 17:
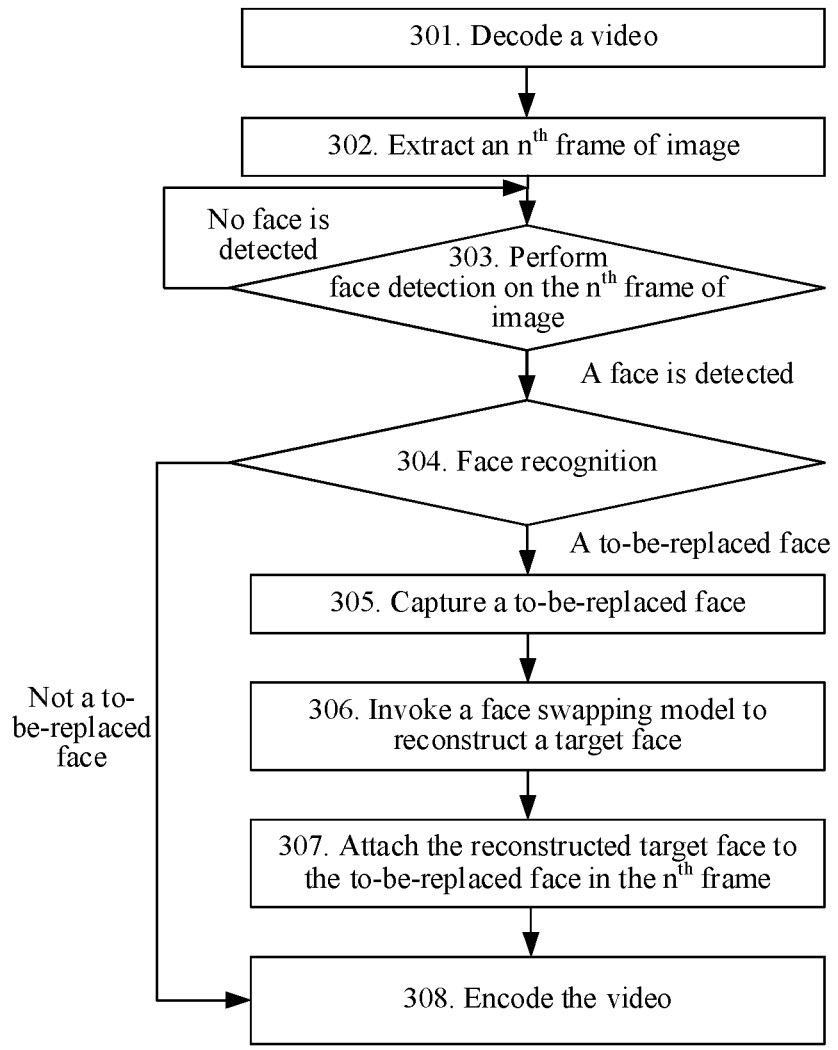
FIG. 17 is a flowchart of forming a video with a face-swapped effect according to an embodiment of this disclosure.

FIG. 17 is a flowchart of forming a video with a face-swapped effect according to an embodiment of this disclosure. A process of making a video with a face-swapped effect by a server is described with reference to the shown steps.

In step 301, a video is decoded.

The video is decoded to obtain a series of frame images. An example in which an n$^{th}$ (n is an integer greater than or equal to 1) frame of image is selected is used below for description.

In step 302, an n$^{th}$ frame of image is extracted.

In step 303, face detection is performed on the n$^{th}$ frame of image, if a face is detected, step 304 is performed, and if no face is detected, the process returns to step 302 to extract an (n+1)$^{th}$ frame of image to continue to perform face detection.

In step 304, facial recognition is performed on the n$^{th}$ frame of image, to determine whether a to-be-replaced face is included, and if yes, step 305 is performed; otherwise, step 308 is performed.

In step 305, the to-be-replaced face is captured.

In step 306, a face swapping model is invoked to reconstruct a target face.

An encoder in the face swapping model encodes a to-be-replaced face to obtain a style feature of the to-be-replaced face, and a decoder corresponding to the target face decodes the style feature to obtain a target face having the style feature.

In step 307, the reconstructed target face is attached to the to-be-replaced face in the n$^{th}$ frame.

In step 308, the video is encoded.

After processing of the frame images in the video is completed, each frame of video is encoded according to an original format of the video, or may be encoded into another format.

It may be understood that the video production processing may alternatively be migrated to a terminal, and adaptive decoding/encoding parameters may be adopted according to a hardware configuration of the terminal.

Through the training method for an image processing model shown in the embodiments of this disclosure, when the user intends to invoke the image processing model to swap a face image in a video image frame, only a decoder of a to-be-replaced image in the image processing model is retrained. When the parameters of the image processing model shown in Table 1 and Table 2 above are adopted, a quantity of the encoders and a quantity of decoders required by the image processing model are shown in Table 3, where a quantity of parameters of the encoder is about 11.24 times of a quantity of parameters of the decoder. Therefore, in a process of updating the parameters of the decoder according to features of the target face in the target image while maintaining the parameters of the encoder unchanged, a training time of the image processing model can be effectively reduced.

TABLE 3

| Image processing model | Quantity of encoders | Quantity of decoders |
|---|---|---|
| Quantity of parameters | 69662976 | 6199747 |

In conclusion, the embodiments of this disclosure can have the following beneficial effects:
1. An encoder only needs to be initialized once, and subsequently, it is only necessary to train decoders selectively. Therefore, the quantity of parameters that need to be optimized is greatly reduced, and the training speed is improved.
2. Because the quantity of parameters that need to be optimized is greatly reduced, an image processing model is less likely to be over-fitted, thereby reducing dependence on the quantity of samples. For example, a face swapping model can be trained by using 150 faces (instead of at least 300 faces required by an original model).
3. In a process of training the image processing model, only a decoder of a corresponding to-be-replaced face needs to be trained, and there is no need to repeatedly train the encoder. Therefore, in the same hardware condition, more image processing models can be trained simultaneously.

The foregoing descriptions are merely exemplary embodiments of this disclosure, and are not intended to limit this disclosure. Any modification, equivalent replacement and improvement made within the spirit and principle of this disclosure shall fall within the protection scope of this disclosure.

The embodiments of this disclosure further provide a computer program product including instructions, the computer program product, when run on a server, causing the server to perform the training method or image processing method for an image processing model according to the foregoing embodiments.

What is claimed is:

1. A training method for an image processing model, the method comprising:
updating, by circuitry, parameters of an encoder in the image processing model according to a to-be-replaced face in an original image, to configure the encoder to encode the to-be-replaced face to obtain a visual feature of the to-be-replaced face;
updating parameters of a decoder in the image processing model according to the to-be-replaced face in the original image, to configure the decoder to perform decoding based on the visual feature of the to-be-replaced face; and
updating the parameters of the decoder according to a target face in a plurality of target images without changing the parameters of the encoder, to configure the decoder to perform decoding based on the visual feature of the to-be-replaced face and obtain the target face having the same visual feature as the to-be-replaced face,
wherein the decoder is trained with the target face in the plurality of target images and the encoder is not trained with the target face in the plurality of target images.

2. The method according to claim 1, wherein the updating the parameters of the encoder comprises:
substituting a facial image of a to-be-replaced face in a distorted original image of the original image into a loss function corresponding to a self-encoding network formed by the encoder and the decoder; and
determining the parameters corresponding to the encoder based on the loss function satisfying a convergence condition.

3. The method according to claim 1, wherein the updating the parameters of the decoder comprises:
substituting a facial image of a to-be-replaced face in a distorted original image of the original image into a loss function corresponding to a self-encoding network formed by the encoder and the decoder; and
determining the parameters of the decoder based on the loss function satisfying a convergence condition.

4. The method according to claim 1, wherein the updating the parameters of the decoder comprises:
substituting a facial image of the target face in a distorted target image of the plurality of target images into a loss function corresponding to a self-encoding network formed by the encoder and the decoder; and
determining, without changing the parameters of the encoder in the loss function, the parameters of the decoder based on the loss function satisfying a convergence condition.

5. The method according to claim 1, wherein before the updating the parameters of the encoder, the method further comprises:
capturing, from sample images of a sample image set, the original image comprising the to-be-replaced face; and
aligning a plurality of captured original images based on feature points of the to-be-replaced face.

6. The method according to claim 1, wherein before the updating the parameters of the encoder, the method further comprises:
performing random augmentation on the original image;
performing random distortion on the original image on which the random augmentation has been performed, to obtain a distorted original image;
capturing a facial image of a to-be-replaced face in the distorted original image; and
scaling the captured facial image according to an input resolution supported by the encoder during the updating of the parameters of the encoder.

7. The method according to claim 6, wherein the performing the random augmentation comprises:
performing random rotation based on a center of the original image;
performing random scaling on the original image obtained after the random rotation; and
performing random translation on the original image obtained after the random scaling.

8. The method according to claim 6, wherein the performing the random distortion comprises:
inserting noise into the original image on which the random augmentation has been performed, the noise comprising at least one of fixed noise and dynamic noise.

9. The method according to claim 8, wherein the inserting the noise into the original image comprises:
generating a grid on the original image on which the random augmentation has been performed; and
adding noise corresponding to coordinates of at least one node in the grid.

10. A non-transitory computer-readable storage medium storing instructions which when executed by a processor cause the processor to perform the training method according to claim 1.

11. An image processing method for an image processing model, the method comprising:
encoding, by an encoder of the image processing model, an original image to obtain a visual feature of a to-be-replaced face in the original image; and
performing, by circuitry of a decoder of the image processing model, decoding based on the visual feature of the to-be-replaced face to obtain a target face having the same visual feature as the to-be-replaced face, wherein
parameters of the decoder are obtained by performing an update according to a plurality of target images comprising the target face without changing parameters of the encoder, and
the decoder is trained with the target face in the plurality of target images and the encoder is not trained with the target face in the plurality of target images.

12. A training apparatus for an image processing model, comprising:
circuitry configured to
update parameters of an encoder in the image processing model according to a to-be-replaced face in an original image, to configure the encoder to encode the to-be-replaced face to obtain a visual feature of the to-be-replaced face;
update parameters of a decoder in the image processing model according to the to-be-replaced face in the original image, to configure the decoder to perform decoding based on the visual feature of the to-be-replaced face; and
update the parameters of the decoder according to a target face in a plurality of target images without changing the parameters of the encoder, to configure the decoder to perform decoding based on the visual feature of the to-be-replaced face and obtain the target face having the same visual feature as the to-be-replaced face,
wherein the decoder is trained with the target face in the plurality of target images and the encoder is not trained with the target face in the plurality of target images.

13. The apparatus according to claim 12, wherein the circuitry is configured to:
substitute a facial image of a to-be-replaced face in a distorted original image of the original image into a loss function corresponding to a self-encoding network formed by the encoder and the decoder; and
determine the parameters corresponding to the encoder based on the loss function satisfying a convergence condition.

14. The apparatus according to claim 12, wherein the circuitry is configured to:
substitute a facial image of a to-be-replaced face in a distorted original image of the original image into a loss function corresponding to a self-encoding network formed by the encoder and the decoder; and
determine the parameters of the decoder based on the loss function satisfying a convergence condition.

15. The apparatus according to claim 12, wherein the circuitry is configured to:
substitute a facial image of the target face in a distorted target image of the plurality of target images into a loss function corresponding to a self-encoding network formed by the encoder and the decoder; and
determine, without changing the parameters of the encoder in the loss function, the parameters of the decoder based on the loss function satisfying a convergence condition.

16. The apparatus according to claim 12, wherein the circuitry is configured to:
capture, from sample images of a sample image set, the original image comprising the to-be-replaced face; and
align plurality of captured original images based on feature points of the to-be-replaced face.

17. The apparatus according to claim 12, wherein the circuitry is configured to:
perform random augmentation on the original image;
perform random distortion on the original image on which the random augmentation has been performed, to obtain a distorted original image;
capture a facial image of a to-be-replaced face in the distorted original image; and
scale the captured facial image according to an input resolution supported by the encoder during the updating of the parameters of the encoder.

18. The apparatus according to claim 17, wherein the circuitry is configured to:
perform random rotation based on a center of the original image;
perform random scaling on the original image obtained after the random rotation; and
perform random translation on the original image obtained after the random scaling.

19. The apparatus according to claim 17, wherein the circuitry is configured to:
insert noise into the original image on which the random augmentation has been performed, the noise comprising at least one of fixed noise and dynamic noise.

20. The apparatus according to claim 19, wherein the circuitry is configured to:
generate a grid on the original image on which the random augmentation has been performed; and
add noise corresponding to coordinates of at least one node in the grid.

* * * * *